(12) United States Patent
Patel et al.

(10) Patent No.: US 12,212,403 B2
(45) Date of Patent: Jan. 28, 2025

(54) SWITCHING RADIOFREQUENCY CHAINS

(71) Applicant: Hughes Network Systems, LLC, Germantown, MD (US)

(72) Inventors: Kumud Patel, Clarksburg, MD (US); Jack Edwin Lundstedt, Jr., Monrovia, MD (US); Walter Kepley, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 234 days.

(21) Appl. No.: 17/704,784

(22) Filed: Mar. 25, 2022

(65) Prior Publication Data

US 2023/0074318 A1   Mar. 9, 2023

Related U.S. Application Data

(60) Provisional application No. 63/242,483, filed on Sep. 9, 2021, provisional application No. 63/242,478, filed on Sep. 9, 2021.

(51) Int. Cl.
  *H04B 7/185*   (2006.01)
(52) U.S. Cl.
  CPC .............. *H04B 7/18519* (2013.01)
(58) Field of Classification Search
  CPC ....... H04B 7/185; H04B 7/1859; H04L 12/00; H04H 40/90
  See application file for complete search history.

(56) References Cited

U.S. PATENT DOCUMENTS

| 4,932,070 | A | 6/1990 | Waters et al. |
| 5,535,191 | A | 7/1996 | Park |
| 5,659,892 | A | 8/1997 | Soleimani et al. |
| 5,850,389 | A | 12/1998 | Wesler |
| 5,896,421 | A | 4/1999 | Zamat et al. |
| 5,983,085 | A | 11/1999 | Zamat et al. |

(Continued)

OTHER PUBLICATIONS

Bookham, "The use of redundancy and control facilities in satellite modem clusters," Jan. 1, 1989, pp. 5/1-5/4.

(Continued)

*Primary Examiner* — Hai V Nguyen
(74) *Attorney, Agent, or Firm* — Fish & Richardson P.C.

(57) ABSTRACT

In some implementations, methods, systems, and apparatus, including machine-readable media storing executable instructions, are provided for switching radio frequency chains. For example, a gateway for a satellite communication system can include a first radiofrequency chain, a second radiofrequency chain, and a third radiofrequency chain configured to operate in a standby mode. The gateway includes radiofrequency switches configured to (i) switch between coupling the first radiofrequency chain and the third radiofrequency chain to a first antenna feed for the first channel, and (ii) switch between coupling the second radiofrequency chain and the third radiofrequency chain to a second antenna feed for the second channel. The gateway also includes a controller configured to monitor the status of the radiofrequency chains and, based on the monitored status, instruct the radiofrequency switches to switch between different connections of the radiofrequency chains with the antenna feeds.

20 Claims, 6 Drawing Sheets

(56) References Cited

U.S. PATENT DOCUMENTS

| | | | | |
|---|---|---|---|---|
| 6,112,085 | A * | 8/2000 | Garner | H04B 7/18567 |
| | | | | 455/430 |
| 6,157,621 | A * | 12/2000 | Brown | H01Q 25/008 |
| | | | | 370/310 |
| 6,477,370 | B1 * | 11/2002 | Sigler | H04B 7/18567 |
| | | | | 455/512 |
| 6,587,687 | B1 * | 7/2003 | Wiedeman | H04B 7/18513 |
| | | | | 455/428 |
| 6,600,730 | B1 | 7/2003 | Davis et al. | |
| 6,636,721 | B2 * | 10/2003 | Threadgill | H04B 7/18539 |
| | | | | 455/12.1 |
| 6,650,869 | B2 | 11/2003 | Kelly et al. | |
| 6,728,535 | B2 * | 4/2004 | Parkman | H04W 24/00 |
| | | | | 455/430 |
| 6,795,408 | B1 * | 9/2004 | Hiett | H04B 7/18508 |
| | | | | 370/338 |
| 6,847,817 | B2 * | 1/2005 | Hadinger | H04B 7/18584 |
| | | | | 455/430 |
| 6,850,497 | B1 * | 2/2005 | Sigler | H04B 7/1853 |
| | | | | 455/526 |
| 7,164,661 | B2 | 1/2007 | Kelly | |
| 7,683,842 | B1 | 3/2010 | Engel et al. | |
| 8,022,781 | B2 | 9/2011 | Miller | |
| 8,416,882 | B2 | 4/2013 | Corman et al. | |
| 8,484,384 | B2 * | 7/2013 | Tamalet | H04L 67/51 |
| | | | | 370/310 |
| 9,106,471 | B2 | 8/2015 | Patel et al. | |
| 9,578,646 | B2 | 2/2017 | Vasavada et al. | |
| 9,628,832 | B2 | 4/2017 | Crookes et al. | |
| 9,948,381 | B2 | 4/2018 | Mendelsohn et al. | |
| 10,205,512 | B2 | 2/2019 | Patel et al. | |
| 10,236,575 | B2 | 3/2019 | Lundstedt et al. | |
| 10,588,029 | B1 * | 3/2020 | Kay | H04W 16/28 |
| 10,727,949 | B2 * | 7/2020 | Kay | H04B 7/18504 |
| 10,797,784 | B2 * | 10/2020 | Hreha | H04L 1/0009 |
| 10,834,612 | B2 * | 11/2020 | Kay | H04W 16/28 |
| 10,985,833 | B2 * | 4/2021 | Mendelsohn | H01Q 1/288 |
| 11,012,157 | B2 * | 5/2021 | Kay | H04B 7/18513 |
| 11,196,456 | B2 * | 12/2021 | Merchlinsky | H04L 1/22 |
| 11,542,040 | B1 * | 1/2023 | Hemmati | H04B 7/18576 |
| 11,652,541 | B1 * | 5/2023 | Yao | H04B 7/18519 |
| | | | | 370/316 |
| 11,770,179 | B2 * | 9/2023 | Mendelsohn | H04B 7/2041 |
| | | | | 455/13.3 |
| 11,817,938 | B2 * | 11/2023 | Rohde | H04B 7/2125 |
| 2002/0098814 | A1 | 7/2002 | Clewer et al. | |
| 2002/0164981 | A1 * | 11/2002 | Parkman | H04W 24/00 |
| | | | | 455/445 |
| 2003/0045232 | A1 * | 3/2003 | Parkman | H04B 7/18508 |
| | | | | 455/12.1 |
| 2003/0115608 | A1 | 6/2003 | Armstrong et al. | |
| 2004/0157598 | A1 * | 8/2004 | Parkman | H04W 24/00 |
| | | | | 455/12.1 |
| 2005/0187677 | A1 * | 8/2005 | Walker | B64C 13/20 |
| | | | | 701/16 |
| 2009/0296847 | A1 | 12/2009 | Lee | |
| 2010/0019981 | A1 | 1/2010 | Ergene et al. | |
| 2012/0230300 | A1 * | 9/2012 | Goerke | H04B 7/18539 |
| | | | | 370/335 |
| 2018/0375940 | A1 | 12/2018 | Binder et al. | |
| 2019/0067828 | A1 | 2/2019 | McLaren et al. | |
| 2019/0132044 | A1 * | 5/2019 | Hreha | H04B 17/309 |
| 2019/0393905 | A1 | 12/2019 | Patel et al. | |
| 2020/0119811 | A1 * | 4/2020 | Kay | H04B 7/18517 |
| 2020/0187019 | A1 * | 6/2020 | Kay | H04W 16/28 |
| 2020/0235778 | A1 * | 7/2020 | Merchlinsky | H04Q 1/24 |
| 2020/0274611 | A1 * | 8/2020 | Mendelsohn | H01Q 19/17 |
| 2020/0322056 | A1 * | 10/2020 | Kay | H04B 7/19 |
| 2021/0175966 | A1 * | 6/2021 | Rohde | H04B 7/2125 |
| 2021/0314061 | A1 | 10/2021 | Breynaert | |
| 2022/0077597 | A1 | 3/2022 | Corman et al. | |
| 2022/0209853 | A1 * | 6/2022 | Border | H04B 7/18513 |
| 2022/0337308 | A1 * | 10/2022 | Liberg | H04B 7/0628 |
| 2022/0352971 | A1 * | 11/2022 | Liberg | H04B 7/18519 |
| 2023/0070699 | A1 * | 3/2023 | Patel | H04B 1/04 |
| 2023/0071786 | A1 * | 3/2023 | Regunathan | H04B 7/18571 |
| 2023/0074318 | A1 * | 3/2023 | Patel | H04B 7/18519 |
| 2023/0224024 | A1 * | 7/2023 | Mendelsohn | H04B 7/2041 |
| | | | | 455/427 |
| 2023/0269032 | A1 * | 8/2023 | Park | H04B 7/06 |
| 2023/0283360 | A1 * | 9/2023 | Mendelsohn | H01Q 3/20 |
| | | | | 455/13.3 |
| 2023/0396327 | A1 * | 12/2023 | Mendelsohn | H01Q 3/02 |
| 2024/0031001 | A1 * | 1/2024 | Cheema | H04B 7/10 |

OTHER PUBLICATIONS

International Search Report and Written Opinion in International Appln. No. PCT/US2022/042757, mailed on Dec. 15, 2022, 16 pages.

Newerasystems.net [online], "Sector Microwave 754AP6A Baseball Switch,", Jun. 23, 2017, retrieved on Dec. 28, 2021, retrieved from URL<https://newerasystems.net/shop/amplifiers/754ap6a-baseball-switch/>, 2 pages.

Relcommtech.com [online], "Transfer relays," Jul. 30, 2021, retrieved on Dec. 28, 2021, retrieved from URL<https://relcommtech.com/products/transfer-relays/>, 2 pages.

* cited by examiner

SWITCHING RADIOFREQUENCY CHAINS

CROSS-REFERENCE TO RELATED APPLICATIONS

This application claims the benefit of priority from U.S. Provisional Patent Application No. 63/242,478, filed on Sep. 9, 2021, and U.S. Provisional Patent Application No. 63/242,483, filed on Sep. 9, 2021, and the entire contents of the prior applications are incorporated by reference herein.

FIELD

This specification generally describes technology related to enhanced reliability for radiofrequency transmitters for communication systems, such as satellite communication systems.

BACKGROUND

In a satellite communication system, a gateway is used as a ground station to connect a terrestrial network, such as the Internet, and satellites orbiting Earth. For example, the gateway can transmit data from a network, such as the Internet, to the orbiting satellites for transmission to satellite terminals. The gateway can receive data that satellite terminals uplink to the orbiting satellites and relay the data to the network. The gateway can use antennas and other equipment for converting, transmitting, and receiving signals. For example, the gateway includes a radiofrequency transmitter with a transmit chain that includes elements such as a modulator, an up-converter, and a high-power amplifier. Reliability is very important in many communication networks. In many cases, the failure of a transmit chain would lead to an unacceptable loss of network service for many different customers whose network connections rely on the gateway.

SUMMARY

In some implementations, a gateway for a satellite communication system includes different hardware paths used to transmit information. These paths are often referred to as transmit chains, and each transmit chain can include components such as a modulator, an up-converter, and a power amplifier. The gateway can include primary transmit chains to enable transmission on the frequency bands and/or polarizations the system is designed to use. In addition to the primary chains, to ensure service availability in case of a failure, the gateway can include one or more additional transmit chains that serve as standby transmit chains. The gateway can include a controller that monitors the primary transmit chains and switches an antenna connection over to a standby transmit chain when one of the primary transmit chains experiences a failure.

During operation of a gateway, the transmit chains provide a potential point of failure that may interrupt network service. For example, one or more components in a transmit chain may fail to operate properly due to, for example, device failure, external damage, improper configuration, cables becoming disconnected, and so on. The techniques discussed herein provide features that enable a gateway to quickly detect failure of a transmit chain, and to quickly and automatically restore service by switching antenna connections from the failed transmit chain to a standby receive chain.

A gateway can include multiple primary transmit chains to enable the gateway to transmit concurrently using multiple frequency bands and/or polarizations. The gateway includes one or more standby transmit chains that are initially maintained operative (e.g., powered on and operating) but in a standby mode to provide redundancy in case of failure of one of the primary transmit chains. The primary transmit chains and the one or more additional transmit chains can be coupled to an antenna through a set of switches. In normal operation, with the standby transmit chains in standby mode, the switches terminate each standby transmit chain locally so that the standby transmit chains are not connected to an antenna feed. However, when a controller in the system detects a failure in one of the primary transmit chains, the controller causes the switches to connect one of the standby transmit chains to operate in place of the failed transmit chain. The controller also routes the data that would have been provided to the failed transmit chain to the standby transmit chain, which takes over the modulation, upconversion, and power amplification for that data traffic in place of the failed transmit chain. The switches can connect the output of the standby transmit chain to the same antenna feed previously connected to the failed transmit chain, enabling transmission to resume in the same manner and with the same antenna that was previously used by the failed transmit chain. In this manner, the gateway can respond to a failure in any part of a primary transmit chain (e.g., modulator, up-converter, or power amplifier) very quickly using the standby transmit chain to automatically restore service.

In some implementations, a standby transmit chain is provided for each pair of primary transmit chains. For example, for a given frequency band, the gateway may have a first transmit chain for right-hand circular polarized (RHCP) transmissions and a second transmit chain for left-hand circular polarized (LHCP) transmissions. The pair of primary transmit chains can have a dedicated, corresponding standby transmit chain, coupled with switches that are arranged to selectively connect the standby transmit chain in place of either of the primary transmit chains. As a result, a single standby transmit chain provides redundancy to replace either of the primary transmit chains it is associated with.

The gateway can include receive chains to receive data transmitted by a satellite, and these receive chains also have the potential to experience failures. As with the transmit chains, the gateway can include additional standby receive chains that provide redundancy. The receive chains can each include, for example, a low-noise amplifier, a down-converter, and a demodulator, so that each can receive signals from an antenna feed and provide received data to a network. The one or more standby receive chains provide very quickly accessible redundant hardware for reception, just as the standby transmit chains do for transmission. For example, switches can be arranged to selectively provide input signals from antenna ports to the additional receive chains when one of the primary receive chains experiences a failure. A controller can monitor the status of the receive chains and, in response to detecting a failure, control the switches to switch the antenna connection from the failed receive chain to instead connect to provide input to the standby receive chain.

The techniques described herein can provide a number of advantages and benefits. For example, the additional standby transmit chains provide redundancy that improves network service availability and reliability and improves the network's robustness and fault tolerance. In addition, by allowing the immediate switching from a failed primary transmit chain to a standby transmit chain within the same gateway, network service can be restored efficiently and with minimal delay. For example, if the primary transmit chain encounters a failure, the standby transmit chain can take over immediately. As a result, the network service experiences minimal service interruption. Further, because the standby transmit chains are present and integrated into the gateway, the change can be made remotely and without any need to provide hardware. This is a significant advantage because it restores service much faster than a technician could acquire replacement parts and travel to the gateway to perform repairs on site.

In some implementations, a gateway as a whole can operate in a standby mode, ready to support or take over traffic from other gateways. The gateway can include one or more primary transmit chains and one or more standby transmit chains. With the gateway in standby mode, switches between the transmit chains and the antenna ports can maintain all of the transmit chains (e.g., primary and standby) locally terminated, so that there is no actual data transmission to the satellites. However, the equipment of the transmit chains is still powered on and operating in the standby mode, allowing a controller of the gateway to perform continuous monitoring of the health of the gateway, including the health of the one or more primary transmit chains and the one or more standby transmit chains. This can ensure that the gateway is ready to be switched from standby mode to an active use mode, when another gateway fails. For example, if a gateway experiences a high amount of failures or if local conditions provide excessive interference, the communication system can coordinate to switch traffic from the impaired gateway to the standby gateway, which can be confirmed to be operating and ready through the repeated ongoing testing that that gateway provides.

In some implementations, a satellite gateway includes: a first radiofrequency chain configured to transmit or receive information on a first channel; a second radiofrequency chain configured to transmit or receive information on a second channel; a third radiofrequency chain configured to operate in a standby mode while the first radiofrequency chain and second radiofrequency chain are operational; radiofrequency switches configured to (i) switch between coupling the first radiofrequency chain and the third radiofrequency chain to a first antenna feed port for the first channel, and (ii) switch between coupling the second radiofrequency chain and the third radiofrequency chain to a second antenna feed port for the second channel; and a controller configured to monitor a status of the radiofrequency chains, to detect failures of the radiofrequency chains based on the monitoring, and to instruct the radiofrequency switches to (i) couple the third radiofrequency chain to the first antenna feed port when a failure is detected for the first radiofrequency chain, and (ii) couple the third radiofrequency chain to the second antenna feed port when a failure is detected for the second radiofrequency chain.

In some implementations, the first channel is first physical channel in which communication occurs over a particular frequency band with a left-hand circular polarization; the second channel is second physical channel in which communication occurs over the particular frequency band with a left-hand circular polarization; and the first antenna feed port is coupled to a right-hand circular polarized antenna and is configured to receive signals for transmission with a right-hand circular polarization, and the second antenna feed port is coupled to a left-hand circular polarized antenna and is configured to receive signals for transmission with a left-hand circular polarization.

In some implementations, the first radiofrequency chain, the second radiofrequency chain, and the third radiofrequency chain are each transmit chains.

In some implementations: the first radiofrequency chain includes a first up-converter and a first power amplifier; the second radiofrequency chain includes a second up-converter and a second power amplifier; and the third radiofrequency chain includes a third up-converter and a third power amplifier.

In some implementations: the first radiofrequency chain includes a first modulator; the second radiofrequency chain includes a second modulator; and the third radiofrequency chain includes a third modulator.

In some implementations, the radiofrequency switches are placed between the power amplifiers and the antenna feed ports to selectively provide outputs of the power amplifiers to the antenna feed ports.

In some implementations, the first radiofrequency chain, the second radiofrequency chain, and the third radiofrequency chain are each receive chains.

In some implementations: the first radiofrequency chain includes a first amplifier and a first down-converter; the second radiofrequency chain includes a second amplifier and a second down-converter; and the third radiofrequency chain includes a third amplifier and a third down-converter.

In some implementations: the first radiofrequency chain includes a first modulator; the second radiofrequency chain includes a second modulator; and the third radiofrequency chain includes a third modulator.

In some implementations, the radiofrequency switches are placed between the antenna feed ports and the amplifiers to selectively provide input from the antennas to the amplifiers of the receive chains.

In some implementations, the radiofrequency switches comprise two radiofrequency switches, including (i) a first switch arranged to switch the first radiofrequency chain and the third radiofrequency chain between the first antenna feed port and a termination, and (ii) a second switch arranged to switch the second radiofrequency chain and the third radiofrequency chain between the second antenna feed port and a termination.

In some implementations, the radiofrequency switches comprise four radiofrequency switches arranged to selectively (i) couple one of the antenna feed ports with one of the radiofrequency chains, (ii) couple two of the antenna feed ports to different radiofrequency chains, or (iii) couple none of the antenna feed ports to any of the radiofrequency chains.

In some implementations, each of the first radiofrequency chain, the second radiofrequency chain, and the third radiofrequency chain has a coupling port between the radiofrequency chain and the radiofrequency switches; and the controller is configured to receive, for each of the radiofrequency chains, data indicating a status of signals on the radiofrequency chain that is based on the signals on the coupling port for the radiofrequency chain.

In some implementations, the gateway includes: a first coupling port corresponding to the first antenna feed port, the first coupling port being configured to provide signals on the first antenna feed port; a second coupling port corresponding to the second antenna feed port, the first coupling port being configured to provide signals on the first antenna feed port. The controller is configured to receive, for each of the antenna feed ports, data indicating a status of signals on the antenna feed ports that is based on the signals on the coupling port corresponding to the antenna feed port.

In another general aspect, a method includes: operating, by a controller in a gateway of a satellite communication system, (i) a first radiofrequency chain configured to transmit or receive information on a first channel, (ii) a second radiofrequency chain configured to transmit or receive information on a second channel, and (iii) a third radiofrequency chain in a standby mode in which the third radiofrequency chain does not transmit or receive information in the satellite communication system, where the gateway includes radiofrequency switches configured to (i) switch between coupling the first radiofrequency chain and the third radiofrequency chain to a first antenna feed port for the first channel, and (ii) switch between coupling the second radiofrequency chain and the third radiofrequency chain to a second antenna feed port for the second channel; monitoring, by a controller in a gateway of a satellite communication system, a status of the first radiofrequency chain and the second radiofrequency chain; based on the monitoring, detecting, by the controller, a failure in the first radiofrequency chain or the second radiofrequency chain; and in response to detecting the failure, causing, by the controller, the radiofrequency switches to couple the third radiofrequency chain to one of the antenna feed ports in place of the radiofrequency chain in which the failure is detected.

In some implementations, the first radiofrequency chain, the second radiofrequency chain, and the third radiofrequency chain are each transmit chains.

In some implementations, the first radiofrequency chain, the second radiofrequency chain, and the third radiofrequency chain are each receive chains.

In some implementations, the method includes: providing a test input to the third radiofrequency chain; receiving a test output that the third radiofrequency chain produced in response to the test input; and determining, based on the test output, that the third radiofrequency chain is operating correctly. Causing the radiofrequency switches to couple the third radiofrequency chain to one of the antenna feed ports is based on determining that the third radiofrequency chain is operating correctly.

In some implementations: the first radiofrequency chain, the second radiofrequency chain, and the third radiofrequency chain are each transmit chains; the first radiofrequency chain includes a first modulator, a first up-converter, and a first power amplifier; the second radiofrequency chain includes a second modulator, a second up-converter, and a second power amplifier; the third radiofrequency chain includes a third modulator, a third up-converter, and a third power amplifier; causing the radiofrequency switches to couple the third radiofrequency chain to one of the antenna feed ports comprises causing the radiofrequency switches to couple the third radiofrequency chain to the first antenna feed port in place of the first radiofrequency chain; and the method further comprises routing data to be transmitted on the first channel to the third modulator instead of to the first modulator.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
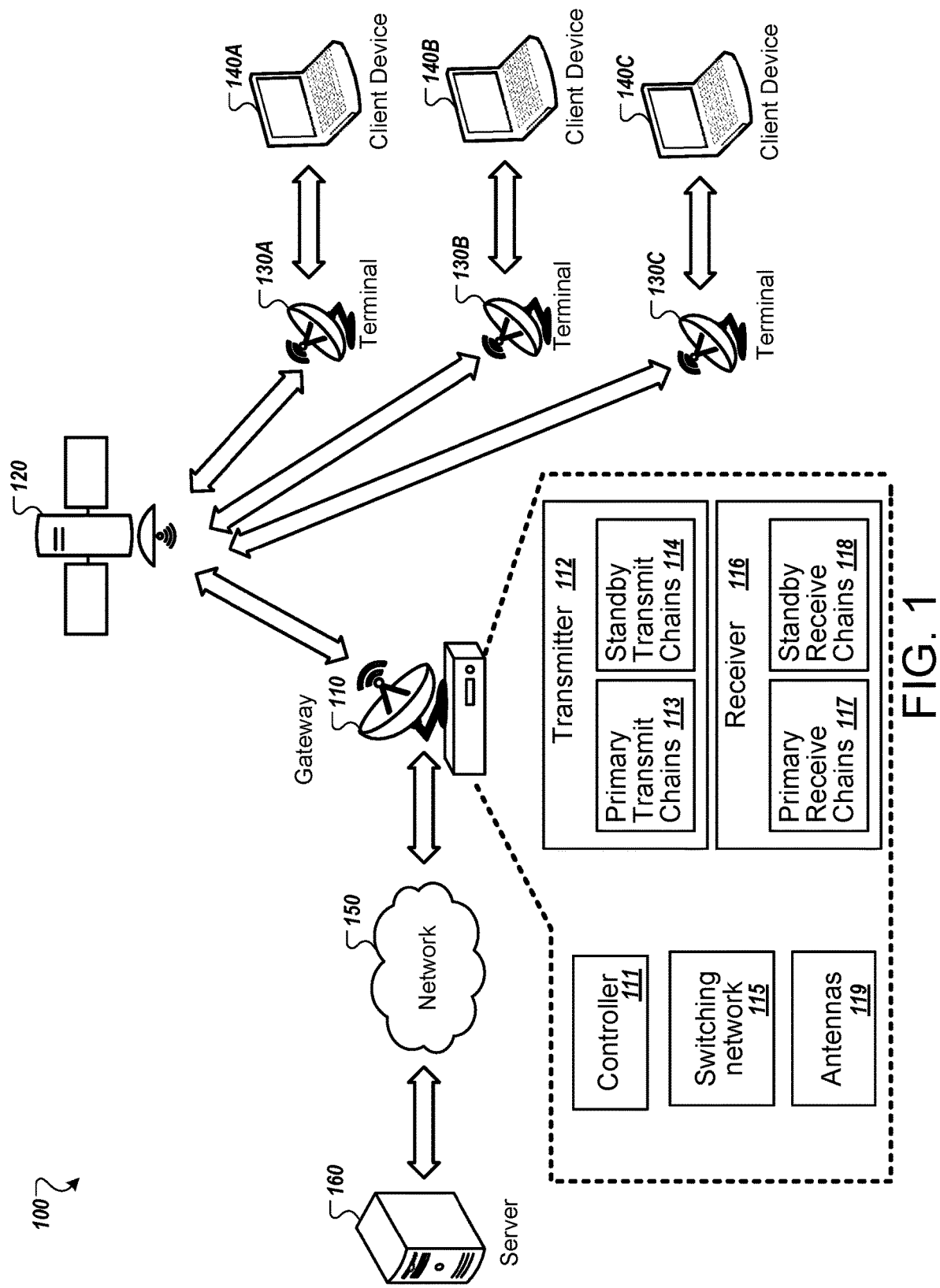
FIG. 1 is a diagram that illustrates an example of a system for satellite communication network.

FIG. 1 is a block diagram that illustrates an example of a satellite communication system 100. In the example of FIG. 1, client devices 140A-140C each obtain network service through a connection with a corresponding satellite terminal 130A-130C. Each terminal 130A-130C communicates wirelessly with a satellite 120, which in turn communicates wirelessly with a terrestrial gateway 110. The gateway 110 has a data connection with a network 150 to provide data to remote servers and devices, for example, server 160. The network 150 can include public and/or private networks, and can include the Internet. The client devices 140A-140C can be devices of any appropriate device that can transfer data over a network, for example, a phone, a laptop computer, a desktop computer, a wearable device, etc.

In the satellite communication system 100, the gateway 110 includes a transmitter 112 that can include multiple transmit chains, including primary transmit chains 113 and standby transmit chains 114 for data transmission. The transmitter 112 can have multiple antenna feeds and a primary transmit chain 113 for each antenna feed. In normal operation, the primary transmit chains 114 are connected to their respective antenna feeds and are used for data transmission. The additional standby transmit chains 114 that do not have a corresponding antenna feed, but can be switched to connect with the antenna feed with one or more of the primary transmit chains 113. As a result, the transmitter 112 can have a greater number of transmit chains than the number of antenna feeds for data transmission.

The one or more additional standby transmit chains 114 can provide redundancy. For example, the standby transmit chains 114 can be used in place of one of the primary transmit chains in the event of a failure occurred on one of the primary transmit chains 113. When not being actively used to transmit data, the one or more standby transmit chains 114 can be maintained in an operating standby state. For example, the standby transmit chains 114 can remain powered on and can be periodically tested to ensure that the standby transmit chains 114 are operating properly.

The transmitter 112 includes a switching network 115 that allows the outputs of the transmit chains 113, 114 to be selectively coupled to various antenna feeds of antennas 119 for data transmission or to terminations that facilitate monitoring. For example, the switching network 115 can be configured to couple the primary transmit chains 113 to their respective antenna feeds for transmission. The switching network 115 can be configured to be able to (i) decouple any of the primary transmit chains 113 from its corresponding antenna feed and (ii) couple one of the standby transmit chains 114 to the antenna feed in place of the primary transmit chain 113 that was decoupled. In this manner, the switching network 115 can be used when a failure occurs on one of the primary transmit chains 113 to replace the failed primary transmit chain 113 a standby transmit chain 114 that can take over for the failed primary transmit chains to continue providing data transmission service.

In many cases, different antennas or different portions of an antenna system are used to transmit data on different physical wireless channels, e.g., different frequency bands, different polarizations, etc. For each of these physical channels a different antenna port or antenna connection may be provided in an antenna feed system. For convenience in reference, these different connections are referred to antenna feeds, e.g., a first antenna feed to receive signals for output with a first polarization and a second antenna feed to receive signals output with a second polarization. Nevertheless, the multiple antenna feeds may be integrated into a single antenna feed system that provides the transmission lines, waveguides, impedance matching devices, or other equipment needed to couple input signal sources to the antennas 119.

The switching network 115 can be implemented in many different ways. In some implementations, the switching network 115 is implemented using radiofrequency switches 210 and can be located at the output of the transmit chains 113. The switching network 115 can be implemented so that connections to antenna feeds are mutually exclusive. In other words, switching one transmit chain 113, 114 to connect to a particular antenna feed disallows the other transmit chains 113, 114 from connecting to that particular antenna feed. As a result, each antenna feed port is connected to the output of only one transmit chain 113, 114 at a time.

Some implementations of the switching network 115 may limit switching to occur within certain groups or subsets of transmit chains 113, 114. For example, each group can include two primary transmit chains 113 and a single standby transmit chain 114, and the switching network 115 enables the standby transmit chain 114 to be used in place of either of the two primary transmit chains 113. Other arrangements can be used, such as each group having one standby transmit chain 114 and four primary transmit chains 113, with the switching network 115 able to selectively connect the standby transmit chain 114 in place of any of the four primary transmit chains 113. In other words, the switching network 115 would enable the connection of every primary transmit chain 113 in the group to its corresponding antenna feed to be replaced with a connection to the standby transmit chain 114 for the group, but the standby transmit chain 114 would only be able to connect to one antenna feed at a time.

In many cases, limiting the number of potential switching options can reduce the number of switching elements needed, reducing the part count and increasing reliability of the gateway 110. This can be done as discussed above by limiting switching within groups subsets of the transmit chains 112, 114 or limiting the number of primary transmit chains 113 that a given standby transmit chain 114 can replace. Nevertheless, in some implementations, the switching network 115 can operate across all transmit chains 113, 114, for example, enabling each standby transmit chain 114 to be connected in place of any of the primary transmit chains 113. In some cases, the switching network 115 may provide a comprehensive set of connections from any transmit chain to any antenna feed, so any of the transmit chains 113, 114 can be connected to any of the antenna feeds for transmission.

In some implementations, in addition to the primary transmit chains 113 and standby transmit chains 114, the gateway 110 can include multiple primary receive chains 117 and one or more standby receive chains 118 to provide data reception from the satellite. If one of the multiple primary receive chains 117 experiences a failure, the gateway 110 can switch to one of the standby receive chains 118 to continue to provide data reception service despite the failure. Similar to the one or more standby transmit chains 114, when not being actively used to receive data, the one or more standby receive chains 118 can be maintained in an operating standby state. The standby receive chains 118 can remain powered on and the gateway 110 can periodically test them to ensure that the standby receive chains 118 are operating properly.

Also like the transmit chains 113, 114, the receive chains 117, 118 can be coupled to one or more antennas 119 through the switching network 115, which can selectively connect different receive chains 117, 118 to the antenna feeds (e.g., antenna ports or connections of an antenna feed system) of the antennas 119. In particular, the switching network 115 can be placed between the antennas 119 and the receive chains 117, 118, so that the switching network 115 selects which of the various receive chains 117, 118 is coupled to receive input from different antennas 119 or different portions of the antennas 119.

The switching network 115 may limit switching to occur within certain groups or subsets of receive chains 117, 118. For example, each group can include two primary receive chains 117 and a single standby receive chain 118, and the switching network 115 enables the standby receive chain 118 to be used in place of either of the two primary receive chains 117. Other arrangements can be used, such as each group having one standby receive chain 118 and four primary receive chains 117, with the switching network 115 able to selectively connect the standby receive chain 118 in place of any of the four primary receive chains 117. In many cases, limiting the number of potential switching options can reduce the number of switching elements needed, reducing the part count and increasing reliability of the system. This can be done as discussed above by limiting switching within groups or subsets of the receive chains 117, 118 or limiting the number of primary receive chains 117 that a given standby receive chain 118 can replace. Nevertheless, in some implementations, the switching network 115 can operate across all receive chains 117, 118, for example, enabling each standby receive chain 118 to be connected in place of any of the primary receive chains 117. In some cases, the switching network may provide a comprehensive set of connections from any receive chain to any antenna feed for reception, so any of the receive chains 117, 118 can be connected to receive input from any of the antenna feeds.

The controller 111 can be implemented as one or more processors or a control system configured to monitor the transmit chains 113, 114 and the receive chains 117, 118. The controller 111 can be electrically connected to the switching network 115, to be able to selectively change which radiofrequency chains 113, 114, 117, 118 are connected to different antenna feeds of the antennas 119. For example, the controller 111 can be a computer system, an embedded system, a system-on-a chip, a microcontroller, or other type of processor, with corresponding memory (e.g., random-access memory (RAM), flash memory, etc.).

The controller 111 monitors the status of the transmit chains 113, 114 and the receive chains 117, 118. This can include communicating with various components of the radiofrequency chains 113, 114, 117, 118 to verify that components are present, powered on, and are responding normally. If any of these conditions are not present, the controller 111 can consider a failure to have occurred in the affected radiofrequency chain 113, 114, 117, 118. In addition, different elements of the radiofrequency chains 113, 114, 117, 118 can be configured to perform self-assessments to verify proper operation, and the results of these component self-assessments can be provided to the controller 111 over a management interface. For example, if a component in one of the radiofrequency chains 113, 114, 117, 118 detects an error or malfunction, the component can report it to the controller 111, which can use the reported event or condition to identify a failure in the radiofrequency chain 113, 114, 117, 118 that includes the component.

The controller 111 also monitors the signals on the radiofrequency chains 113, 114, 117, 118 to verify proper operation. This can include monitoring signals present at any of various different positions along the radiofrequency chains 113, 114, 117, 118, including at the inputs and/or outputs of the radiofrequency chains 113, 114, 117, 118, as well as potentially at positions within individual radiofrequency chains 113, 114, 117, 118 (e.g., at the output of one component providing input to the next within the chain). For radiofrequency chains 113, 114, 117, 118 currently being actively used to send or receive user data, the controller 111 can monitor the signals on the active chains and compare properties the signals detected with expected signal properties. For example, the controller 110 can store data indicating reference signal properties, such as properties of typical load levels and signal patterns observed previously, or signal properties that are designated as representing proper operation. The controller 111 compares the detected current signal properties with those of the reference signal properties, and can determine whether the current signals have the appropriate power levels, frequency content, consistency, and so on. If the controller 111 detects that signal properties deviate by at least a minimum amount from the reference properties (e.g., amplifier output power is too low, up-converter or downconverter output does not show the expected range of variation, etc.), then the controller 111 determines that a failure has occurred for that radiofrequency chain.

In some cases, the controller 111 can send test data through a transmit chain 113, 114 and monitor the output, to verify that the result (e.g., signal properties, data pattern, etc.) is generated as desired. With known input data provided, the proper output can also be known and used by the controller 111 to assess whether the transmit chain 113, 114 is operating properly. This technique can be used to periodically test the standby transmit chains 114 while they are in standby mode and are not connected to an antenna feed for transmission, to verify that the standby transmit chains 114 are still ready to be used in the event of a failure on the other transmit chains 113. For example, the testing can be performed each minute, every 5 minutes, or another appropriate interval. In some cases, the controller 111 can send test data through transmit chains 113 actively used in communication with the satellite 120, but this uses communication throughput that would more preferably be used to carry user data. In some cases, the testing of a standby transmit chain 114 occurs additionally or alternatively in response to detecting a failure in another transmit chain 113, to verify that the standby transmit chain 114 is ready to take over data transmission operations before the controller 111 changes over to using the standby transmit chain 114. The controller 111 can instruct the switching network 115 to couple the standby transmit chain 114 to the antenna feed of a failed transmit chain 113 based on determining that the test shows proper operation.

When the controller 111 instructs the switching network 115 to connect the standby transmit chain 114 to an antenna feed, the controller 111 can also route data to the standby transmit chain 114 to be processed. For example, if the transmit chains 113, 114 each include a separate modulator, the controller 111 can route data for the channel that was handled by the failed transmit chain 113 to the modulator of the standby transmit chain 114 instead. If the transmit chains 113, 114 do not include separate modulators, the controller 111 instead route modulator output (e.g., radiofrequency analog signals modulated onto a baseband or intermediate frequency) for the channel to an up-converter for the standby transmit chain 114.

To monitor the receive chains 117, 118 actively used to receive signals, the controller 111 can assess the amount and quality of received data output and compare this data with references that represent the typical or expected conditions. The controller 111 can detect an error in a receive chain 117, 118 if the amount of data received falls below a threshold, such as a predetermined minimum or an average amount of traffic over a recent period. Thus, if a receive chain suddenly stops providing output data or provides data intermittently, the controller 111 can detect that a failure occurred. Similarly the controller can detect a failure when the amount or rate of data corruption (e.g., detected with parity checking or other error checking) increases significantly for a receive chain 117, 118 being used to receive data. The controller 111 can also test the standby receive chains 118 by providing test input signals with known data content and monitoring signals at various portions of the standby receive chains 118, as well as the data received from the test input signals. The controller 111 can compare the monitored signals and outputs with the known signals and outputs that occur for a properly functioning receive chain, to determine whether the standby receive chains 118 are operating properly. This way, the controller 111 can verify that the standby receive chains 118 are operating properly. The testing can be performed periodically, for example, each minute, every 5 minutes, or at another appropriate interval.

Figure 2:
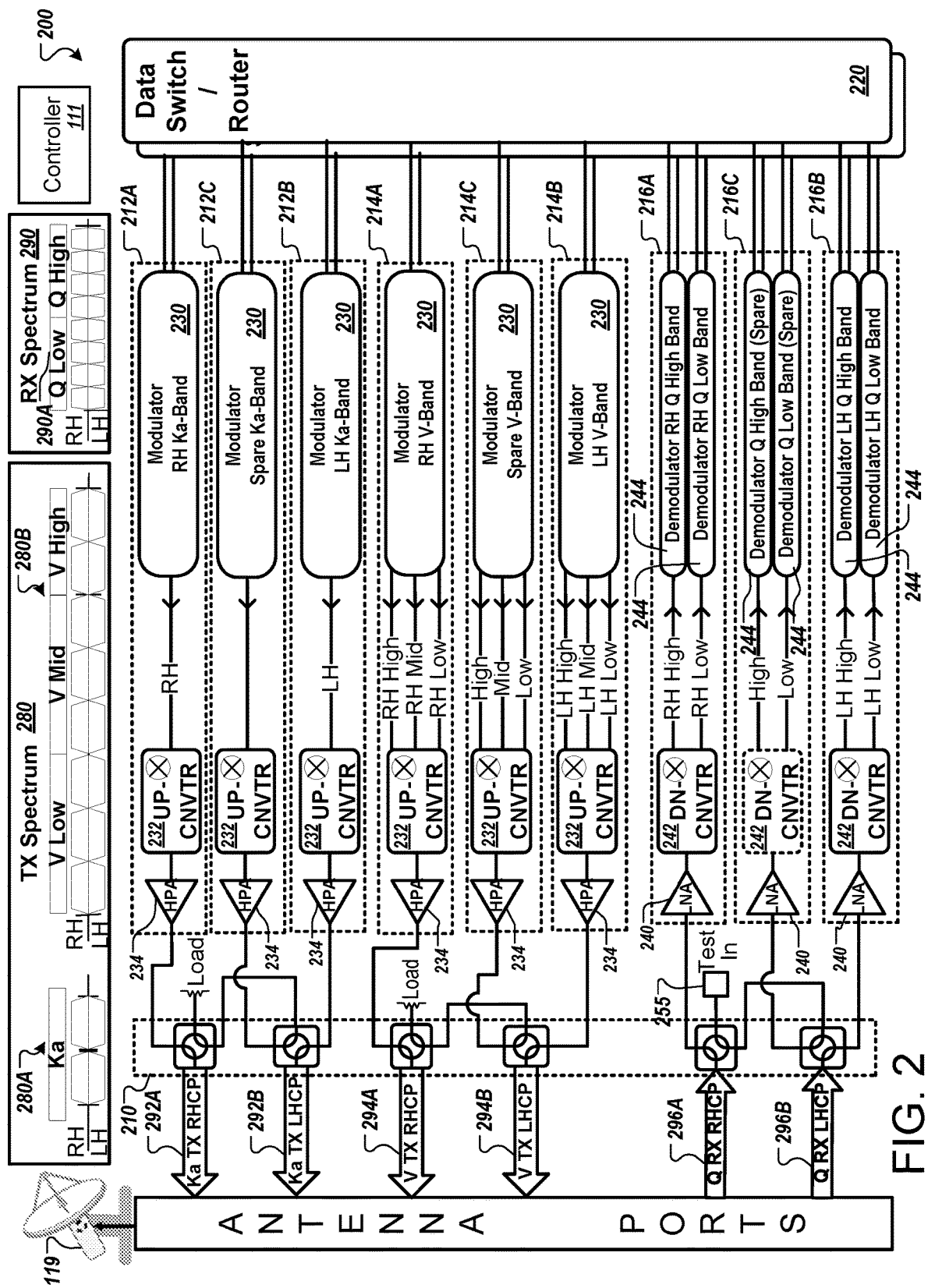
FIG. 2 is a diagram that illustrates an example of a gateway of a satellite communication system that supports switching among transmit chains and switching among receive chains.

FIG. 2 is a diagram that illustrates an example of a gateway 200 in a satellite communication system. The gateway 200 includes transmit chains 212A-212C for transmission on the Ka band 280A, transmit chains 214A-214C for transmission on the V band, and receive chains 216A-216C for receiving on the Q band. For each band, there are two primary radiofrequency chains and a standby radiofrequency chain.

In the example, the transmission spectrum 280 includes frequencies in the Ka band 280A and the V band 280B. The V band 280B includes frequencies in three different ranges: the V low band, the V middle band, and the V high band. The receiving spectrum 290 includes Q band 290A in two different ranges: Q low band and Q high band. Various different frequencies and frequency ranges can be used, including frequency ranges in different bands than those illustrated. Each frequency band can include one or more sub-bands or frequency ranges, each of which can have a corresponding bandwidth (e.g., 0.5 GHz, 1.0 GHz, 1.5 GHz, etc.) as appropriate for the implementation.

The gateway 200 is configured to transmit data received from a terrestrial digital network, such as the Internet, to satellites using multiple transmit chains 212A-212C, 214A-214C. Each transmit chain 212A-212C, 214A-214C includes a modulator 230, an up-converter 232, and a power amplifier 234. Each transmit chain 212A-212C, 214A-214C can also include (i) an analog output interface to provide output to an antenna and (ii) a digital network interface to receive data to transmit. The transmit chains 212A-212C, 214A-214C are coupled to the antenna ports 292A, 292B, 294A, 294B through radiofrequency switches 210. The controller 111 is configured to electronically change the state of the radiofrequency switches 210 to selectively couple different transmit chains 212A-212C, 214A-214C to the antenna ports 292A, 292B, 294A, 294B.

The transmit chains 212A-212C, 214A-214C are grouped by band, with two primary transmit chains and one standby transmit chain for each band used for transmission. The gateway 200 is configured to detect failures in the primary transmit chains and to automatically switch from a failed primary transmit chain to using the standby transmit chain for the band.

As shown, there are two Ka-band channels, one channel for transmission with right-hand circular polarization and a second channel for left-hand circular polarization. Two primary Ka-band transmit chains 212A-212B are provided, a right-hand (RH) transmit chain 212A and a left-hand (LH) transmit chain 212B. The first Ka-band transmit chain 212A includes a first modulator 230, a first up-converter 232, and a first power amplifier 234. The second Ka-band transmit chain includes a second modulator 230, a second up-converter 232, and a second power amplifier 234. The two Ka band modulators 230 receive data from the data switch or router 220 through the digital network interface. Each modulator 230 provides modulated output with a desired bandwidth (e.g., 0.5 GHz, 1.0 GHz, 1.5 GHz, etc.) to a corresponding up-converter 230, which converts the modulator output to a higher frequency. For each transmit chain 212A-212B, the corresponding power amplifier 234 (listed as "HPA" for high power amplifier) amplifies the up-converted signal suitable for transmission with the antenna 119. The amplifiers 234 of the Ka-band transmit chains 234 are coupled through the radiofrequency switches 210 to antenna ports 292A, 292B. In normal operation, while the primary Ka-band transmit chains 212A-212B are operating properly, the radiofrequency switches 210 are set to (i) couple the first primary Ka-band transmit chain to provide input to a Ka-band right-hand circular polarization (RHCP) antenna port 292A, and (ii) couple the second primary Ka-band transmit chain to the Ka-band left-hand circular polarization (LHCP) antenna port 292B.

In addition to the two primary Ka-band transmit chains 212A-212B, the gateway 200 also includes a standby transmit chain 212C for the Ka band. The standby Ka-band transmit chain 212C includes a modulator 230, an up-converter 232, and a power amplifier 234. The standby Ka-band transmit chain 212C has its own data interface with the data switch or router 220 to receive digital data to transmit, and its own radiofrequency output interface to connect with the antenna 119. As shown, in the example, the standby Ka-band transmit chain 212C can have the same components and functionality as either of the primary Ka-band transmit chains 212A-212B. This allows the controller 111 to swap the standby Ka-band transmit chain 212C for either the primary Ka-band transmit chains 212A-212B in the event of a failure.

The illustrated example shows a state of the switches 210 used for normal operation, where the switches 210 couple output of the transmit chain 212A to the antenna port 292A and couple output of the transmit chain 212B to the antenna port 292B. The switches couple the output of the standby transmit chain 212C to a termination load that does not connect to the antenna 119. When the controller 111 detects a failure on one of the primary Ka-band transmit chains 212A-212B, the controller 111 instructs the switches to connect the standby transmit chain 212C in place of the failed transmit chain. For example, if a component in the transmit chain 212A fails, the controller 111 instructs the top-most switch 210 to change its state, which (i) decouples the transmit chain 212A from the antenna port 292A and couples it to the termination load, and (ii) couples the standby transmit chain 212C to the antenna port 292A. The controller 111 also manages routing by the switch or router 220 to route traffic to be transmitted on the Ka-band RHCP channel to be provided to the standby transmit chain 212C, instead of to the transmit chain 212A. In a similar manner, if the transmit chain 212B fails (and the transmit chain 212A is operating properly), then the controller 111 instructs the second switch 210 from the top to change its state, and this change couples the standby transmit chain 212C to the antenna port 292B in place of the transmit chain 212B. Thus, the arrangement enables the standby transmit chain 212C to take over the function of either of the primary transmit chains 212A-212B to provide data transmission service.

In the example, each switch 210 is a 4-port device, with two input ports and two output ports, sometimes referred to as a "baseball switch." This type of switch is configured with four radiofrequency paths. For example, each switch 210 can be a transfer relay that has two independent RF input paths that are transferred simultaneously between the two output ports when switching occurs. This device has two states: (1) a first state in which input port 1 is coupled to output port 1 and input port 2 is coupled to output port 2, and (2) a second state in which input port 1 is connected to output port 2 and input port 2 is coupled to output port 1. The switching action is similar to a dual-pole double throw (DPDT) switch, except the two output ports are commonly shared with each input port (e.g., rather than each input port having a separate pair of output ports, the devices switches between only two output ports). Each switch 210 can configured as a relay or other electrically-actuated device to enable the controller to control the state of each switch 210 electrically.

The gateway 200 also includes three transmit chains 214A-214C for the V band, two primary V-band transmit chains 214A-214B and a standby V-band transmit chain 214C. Each of the transmit chains 214A-214C includes a separate modulator 230, up-converter 232, and power amplifier 234, and radiofrequency switches 210 selectively couple the V-band transmit chains 214A-214B to antenna ports 294A, 294B. The V-band modulators 230 are configured to provide output in three different sub-bands (e.g., high, mid, and low sub-bands of the V band). The controller 111 monitors the primary V-band transmit chains 214A-214B as discussed for the primary Ka-band transmit chains 212A-212B. The controller 111 changes the states of the switches 210 as needed to use the standby V-b and transmit chain 214C in place of either of the primary V-band transmit chains 214A-214B if a failure is detected.

To test whether a transmit chain 212A-212C, 214A-214C is operating properly, the controller 111 can cause known test data to be provided as input into the modulator 230 of the transmit chain 212A-212C, 214A-214C. The controller 111 then monitors the resulting output from the power amplifier 234 of the transmit chain 212A-212C, 214A-214C produced in response to the input test data. The controller 111 can store data indicating the radiofrequency signal characteristics or signal pattern that should occur through proper operation. The controller 111 compares the detected output with the expected output (e.g., a reference signal, or reference signal properties) to determine whether the transmit chain being tested has experienced a failure. For example, if the difference between the monitored output for the test and the expected output for the test satisfies a threshold, it can be determined that the primary transmit chain experienced a failure. For example, if the power output is at least a threshold amount below the expected level, if the signal is not properly modulated, or if the timing of the signal is not correct, then the tested transmit chain can be considered to have failed. The standby transmit chains 212C, 214C can each be tested periodically, as well as potentially immediately prior to switching those standby transmit chains 212C, 214C over to connect to an antenna port 292A-292B, 294A-294B. The primary transmit chains 212A-212B, 214A-214B may also be tested with test patterns from time to time, although it can be preferable to instead evaluate the properties of signals produced from user data being transmitted, to avoid using time of the frequency channels for testing that could otherwise be used to transmit user data.

The gateway 200 is configured to receive data on the Q band using the receive chains 216A-216C. There are two primary receive chains 216A-216B: (i) a right-hand Q-band receive chain 216A for receiving Q-band signals with a with a right-hand polarization, and (ii) a left-hand Q-band receive chain 216B for receiving Q-band signals with a left-hand polarization. There is also a standby Q-band receive chain 216C that can be used in place of either of the primary receive chains 216A-216B. There are two Q band antenna ports, (i) Q-band RHCP antenna port 296A and (ii) Q-band LHCP antenna port 296B. The receive chains 216A-216C are selectively coupled to the Q-band antenna ports 296A, 296B by the switches 210.

Each receive chain 216A-216C includes a low-noise amplifier 240, a down-converter 242, and one or more demodulators 244. For example, each receive chain 216A-216C can include two demodulators 244, one for each of two Q sub-bands (e.g., high and low sub-bands). When used to receive data, the low-noise amplifier (LNA) 240 amplifies input signals from the antenna 119 to higher amplitude without significantly degrading the signal-to-noise ratio. The amplified signals are processed by the down-converter 240 to convert a band-limited signal to a lower frequency signal while preserving the information in the frequency band of interest of the original signal.

In the example, there are two channels received, an RHCP channel and an LHCP channel. Each channel has two sub-bands, with a different demodulator 244 used for each sub-band. For example, for the RHCP Q-band channel, the primary RHCP receive chain 216A can use two different demodulators 244 to receive the high and low sub-bands. For the LHCP Q-band channel, the primary LHCP receive chain 216B uses two different demodulators 244 to receive the high and low sub-bands. The switches 210 couple the primary RHCP receive chain 216A to the antenna port 296A and couple the primary LHCP receive chain 216B to the antenna port 296B.

The standby Q-band receive chain 216C operates in a standby mode while the RH Q band receive chain 216A and the LH Q band receive chain 216B are operating properly. The standby Q-band standby receive chain 216A coupled to a test input 255 by the switches 210 when not connected to one of the antenna ports 296A, 296B. If one of the Q-band primary receive chains 216A-216B fails, the controller 111 detects the failure and instructs the switches 210 to decouple the failed Q-band primary receive chain from its antenna port 296A or 296B, and to couple the standby Q-band receive chain 216C to the antenna port 296A or 296B.

To test whether the standby receive chain 216C is operating properly, the controller 111 can cause a modulated radiofrequency signal (e.g., in the Q band) to be periodically transmitted through the test input 255. The input signal can be a known test input that is generated by a signal generator or can be a recorded signal. The controller 111 monitors the output that the standby receive chain 216C produces in response to the test signal. For example, the controller 111 can receive the data output by the demodulator(s) 244 and compare the received data with the known set of data encoded in the test signal provided at the test input. If the controller 111 determines that the received data matches the data transmitted, the standby receive chain 216C is determined to be operating properly. If the received data does not match the data transmitted, then the controller 111 determines that the standby receive chain 216C is not operating properly and is not available to be switched to in the event of a failure on one of the other receive chains 216A-216B.

FIGS. 3-6 show another example of a gateway 300 that has multiple transmit chains 302A-302C that are selectively coupled to antenna feed ports through radiofrequency switches 304A-304D. The respective figures show different states of the switches 304A-304D used for different situations the gateway 300 may encounter. For example, the figures show normal operation (FIG. 3), a situation where the RHCP transmit chain 302A failed and the standby transmit chain 302C is used in its place (FIG. 4), a situation where the LHCP transmit chain 302B failed and the standby transmit chain 302C is used in its place (FIG. 5), and a situation where all of the transmit chains 302A-302C are terminated and monitored without being coupled to the antenna feed ports.

In the example of FIGS. 3-6, each transmit chain 302A-302C includes an up-converter 306 (e.g., a block up-converter or "BUC"), a power amplifier 308, and one or more coupling ports 310 used for monitoring. Unlike the example of FIG. 2, each transmit chain 302A-302C does not include its own modulator. As a result, the gateway 300 may optionally use a single modulator for each channel (e.g., one for RCHP transmission, and another for LHCP transmission) and simply pass the modulator output for a channel to the standby transmit chain 302C when the standby transmit chain 302C is used for that channel. As another example, each transmit chain 302A-302C may optionally include a separate modulator, in the same manner shown in FIG. 2, to provided redundancy in case of a modulator failure.

The radiofrequency switches 304A-304D can be of the same type as the radiofrequency switches 210 discussed with respect to FIG. 2. For example, the radiofrequency switches 304A-304D can be electronically-controlled switches with two radiofrequency input ports and two radiofrequency output ports, such as the transfer relays discussed above.

The example of FIGS. 3-6 uses four radiofrequency switches 304A-304D for each set of three transmit chains 302A-302C, in contrast to the example of FIG. 2 that two radiofrequency switches 210 for each set of three radiofrequency chains. The arrangement in FIGS. 3-6 provides the capability for each of the three transmit chains 302A-302C to be simultaneously terminated and monitored without any of the transmit chains 302A-302C being coupled to the antenna feed ports. In the FIG. 2 arrangement, changing the state of a single switch 210 immediately swaps the antenna connection of a primary radiofrequency chain over to the corresponding standby radiofrequency chain. As a result, each antenna port 292A-292B, 294A-294B, 296A-296B was always coupled to one of the radiofrequency chains for all states of the switches 210. In the arrangement of FIGS. 3-6, however, the switches 304A-304DA, 304B enable any or all of the primary transmit chains 302A, 302B to be decoupled from the antenna feed ports and terminated, without coupling the standby transmit chain 302C to the antenna feed. The switch 304C enables the standby transmit chain 302C to be terminated locally. In the case where the switch 304C does not terminate the standby transmit chain 302C, the switch 304D selects whether to route the standby transmit chain to the RHCP or the LHCP branch. At that point, the standby transmit chain 302C is either be terminated or connected to an antenna feed port, depending on the state of the switch 304A for the RHCP branch or switch 304B for the LHCP branch.

Figure 3:
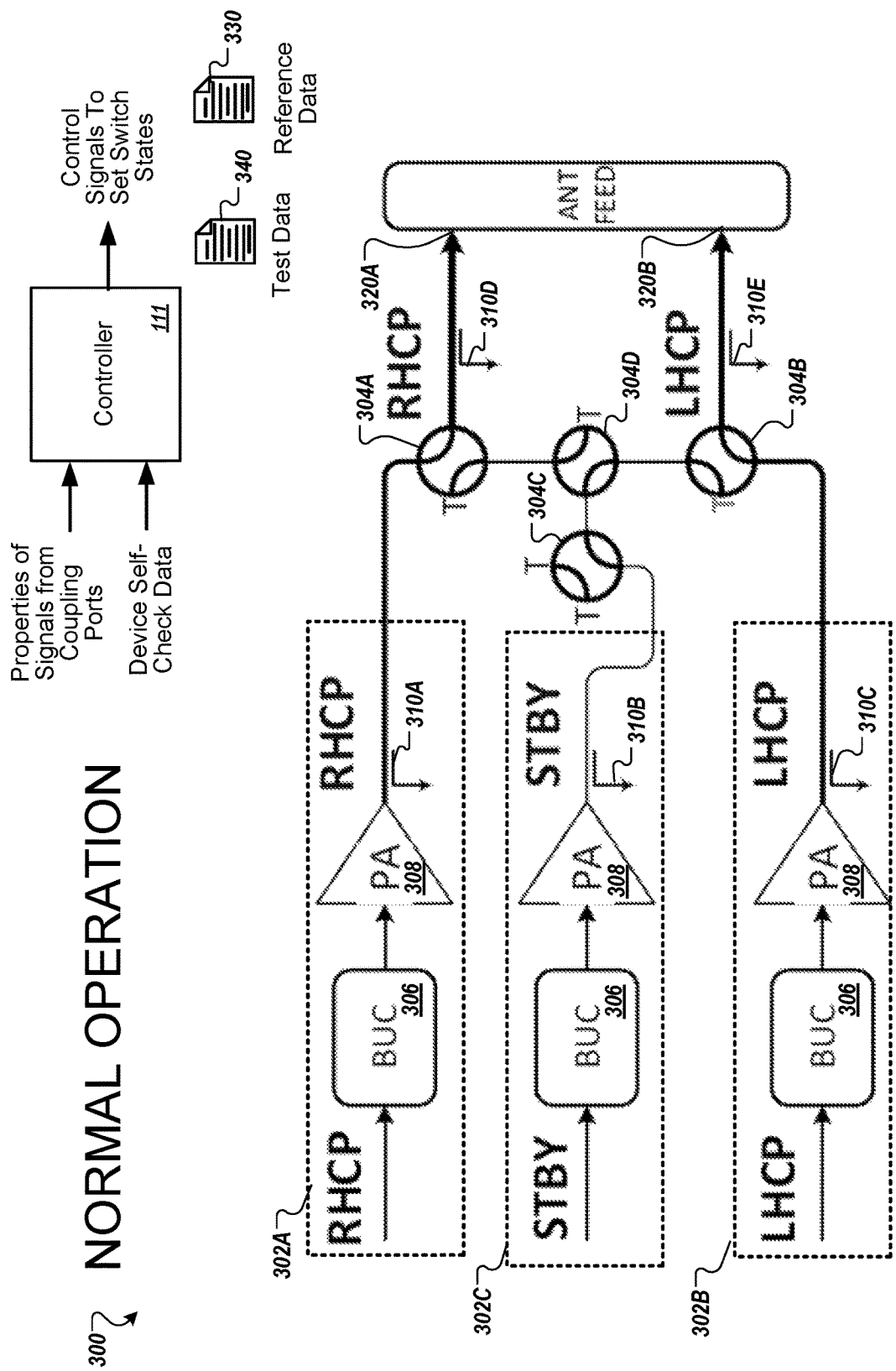
FIG. 3 is a diagram that illustrates an example of a gateway in normal operation, in which a standby transmit chain remains in a standby mode.

In further detail, FIG. 3 illustrates an example of the gateway 300 in normal operation. The gateway 300 transmits data using two primary transmit chains: the RHCP transmit chain 302A, and the LHCP transmit chain 302B. The switches 304A-304D are set to (i) provide signals output by the RHCP transmit chain 302A to a RHCP antenna feed port 320A, for transmission with right-hand circular polarization, and (ii) provide signals output by the LHCP transmit chain 302B to a LHCP antenna feed port 320B, for transmission with left-hand polarization.

The standby transmit chain 302C that operates in a standby mode while the RHCP transmit chain 302A and LHCP transmit chain 302B are operational (e.g., operating properly). The radiofrequency switches 304A-304D are capable of coupling the standby transmit chain 302C to either of the antenna feed ports 320A, 320B, under control of the controller 111, when one of the primary transmit chains 302A, 302B encounters a failure or error. In FIG. 3, however, the switch 304C connects the standby transmit chain 302C to a termination load, indicated by "T" in the figure. As a result, the standby transmit chain 302C is decoupled from the antenna feed in standby mode.

Figure 4:
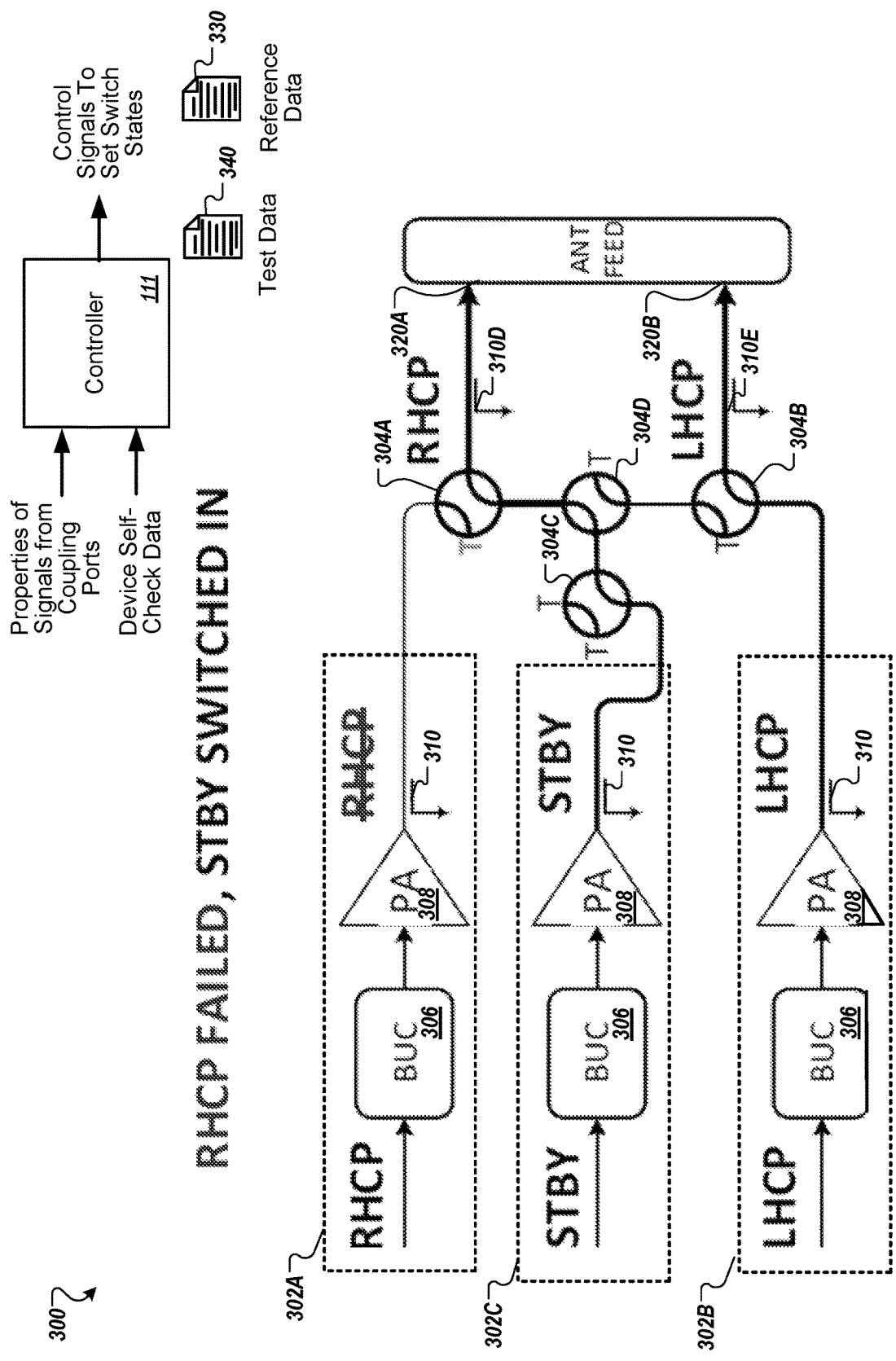
FIG. 4 is a diagram that illustrates an example of the gateway of FIG. 3 using a standby transmit chain to provide service after a failure in a right hand circular polarization (RHCP) transmit chain.
Figure 5:
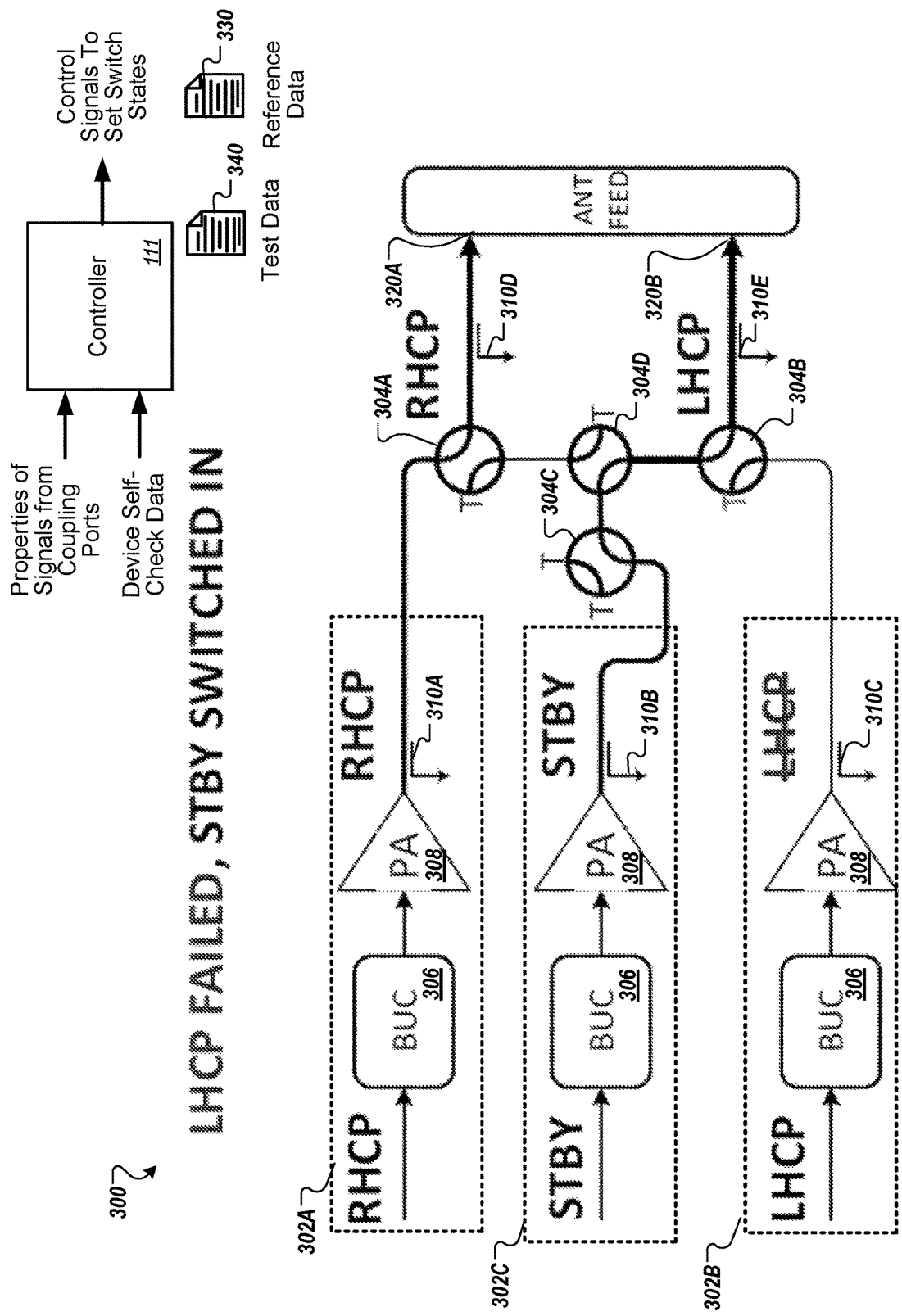
FIG. 5 is a diagram that illustrates an example of the gateway of FIG. 3 using a standby transmit chain to provide service after a failure in a left hand circular polarization (LHCP) transmit chain.

The controller 111 monitors signals output from the primary transmit chains 302A, 302B and detects failures or errors for the primary transmit chains 302A, 302B. In response to detecting failures or errors on at least one of the primary transmit chains 302A, 302B, the controller 111 can instruct the switches 304A-304D to couple the standby transmit chain 302C to either of the RHCP antenna feed and the RHCP antenna feed, depending on which transmit chain 302A-302B experienced the failure. For example, the controller 111 is configured to output control signals to the respective switches 304A-304D, where the control signals can set or change the state of each switch 304A-304D individually. When an error or failure is detected for the RHCP transmit chain 302A, the controller 111 can instruct the switches 304A-304D to connect the standby transmit chain 302C to the RHCP antenna feed 320A. When an error or failure is detected for the LHCP transmit chain 302B, the controller 111 can instruct the switches 304A-304D to connect the standby transmit chain 302C to the LHCP antenna feed 320B. FIGS. 4-5 and associated illustrate these scenarios further. The controller 111 can be configured to automatically perform the switching from a primary transmit chain 302A, 302B to the standby transmit chain 302C. In some implementations, a user can also interact with the system to instruct the controller 111 to initiate the switching.

The controller 111 receives self-check data or status data from the various devices in the transmit chains 302A-302C. For example, each up-converter 306 and power amplifier 308 may provide a signal indicating the status of the device (e.g., indicating whether the device is on or off, the load level or power level, the output signal amplitude, etc.). The devices may optionally be configured to respond to requests for status information from the controller 111. This status information for devices within the transmit chains 302A-302C provides the controller one type of information that can be used to detect failures. For example, if a device fails to provide status information, or indicates a configuration or operating mode that is different from what is required, the controller 111 can determine that the transmit chain 302A-302C with the device indicating the error should not be used. The controller 111 can store reference data 330 that indicates the appropriate responses or status values that indicate proper operations and/or the responses or values that indicate improper operation, allowing the controller 111 to make comparisons to determine whether the device states are appropriate for proper operation.

The controller 111 also receives input that indicates the characteristics of signals output by the transmit chains 302A-302C, as well as characteristics of signals provided to the antenna feed ports 320A-320B. To facilitate monitoring, each transmit chain 302A-302C can include a corresponding coupling port 310A-310C that can serve as a monitoring point to check the signal present. As illustrated, the coupling ports 310A-310C are placed at the end of the transmit chains 302A-302C, between the power amplifiers 308 and the switches 304A-304D. This enables the gateway 300 to monitor the signal present at the output of each transmit chain 302A-302C. There are also coupling ports 310D-310E located after the switches 304A-304D, arranged to monitor the signals provided to the different antenna feed ports 320A-320B. The controller 111 can use the signals monitored on the coupling ports 310D-310E to verify that the switches 304A-304D are operating correctly and are passing the appropriate signals as instructed by the controller 111. The gateway 300 can include signal analysis and monitoring components (e.g., a spectrum analyzer) that are coupled to the various coupling ports 310A-310E, which can determine the properties of the signals present and provide digital values indicating the determined properties (e.g., dominant frequency, power, distortion, harmonics, bandwidth, and other spectral components) to the controller 111.

While the transmit chains 302A-302B are used to transmit data in the satellite communication system, the controller 111 can monitor the output that represents user data being transmitted. The controller 111 can store data indicating the properties used for transmission (e.g., carrier frequency, frequency band, modulation type, symbol rate, etc.) and look up in the reference data 330 the corresponding properties that should be present in output signals. This enables the controller 111 to compare the signal properties monitored with the reference properties that occur during proper operation with the configuration being used. Similarly, the controller 111 can compare the monitored signal properties with reference data indicating recent (e.g., last 15 minutes, last day, etc.) or typical outputs for the transmit chain when it was known to be operating properly. If the controller 111 detects a deviation from the expected signal properties, and the deviation exceeds a predetermined threshold or magnitude, then the controller 111 can determine that a failure has occurred.

The controller 111 can also provide test data 340 to modulators or otherwise test modulator output to provide to the transmit chains 302A-302C for testing. The controller 111 can periodically provide test signals as input to the standby transmit chain 302C in order to test the function of the standby transmit chain 302C. For example, while transmitting information on the RHCP transmit chain 302A and the LHCP transmit chain 302B, the gateway 300 can send test signals through the standby transmit chain 302C and compare the resulting output with reference outputs to make sure the standby transmit chain 302C is ready to operate in place of one of the primary transmit chains 302A, 302B. In some implementations, the controller 111 may also test the primary transmit chains 302A, 302B in a similar way by providing test signals in between signals for user data transmitted in the system.

FIG. 4 is a diagram that illustrates an example of the gateway 300 experiencing a failure in the RHCP transmit chain 302A. The controller 111 has detected the failure and has controlled the switches 304A-304D to couple the standby transmit chain 302C to the RHCP antenna port in place of the failed primary RHCP transmit chain 302A. The controller 111 instructed the switch 304A to decouple the RHCP transmit chain 402A from the RHCP antenna feed port 320A, and to terminate the RHCP transmit chain 402A instead. The controller 111 also changes the state of the switch 304D to cause the standby transmit chain 402C to be coupled with the RHCP antenna feed port 320A (e.g., through switches 304C, 304D, and 304A). As a result, the standby transmit chain 402C takes over for the failed RHCP transmit chain 402A and continues providing data transmission service for the RHCP channel.

FIG. 5 is a diagram that illustrates an example of the gateway 300 experiencing a failure in the LHCP transmit chain 302B. The controller 111 has detected the failure and has controlled the switches 304A-304D to couple the standby transmit chain 302C to the LHCP antenna port in place of the failed primary LHCP transmit chain 302B. In response to detecting the error on the LHCP transmit chain 302B, the controller 111 instructs the switch 304B to decouple the LHCP transmit chain 302B from the LHCP antenna feed port 320B, and to terminate the LHCP transmit chain 302B instead. The controller 111 sets the states of the switches 304C, 304D, and 304B to couple the standby transmit chain 302C to the LHCP antenna feed port 320B. As a result, the standby transmit chain 302C takes over for the failed LHCP transmit chain 302B and continues providing data transmission service for the LHCP channel.

Figure 6:
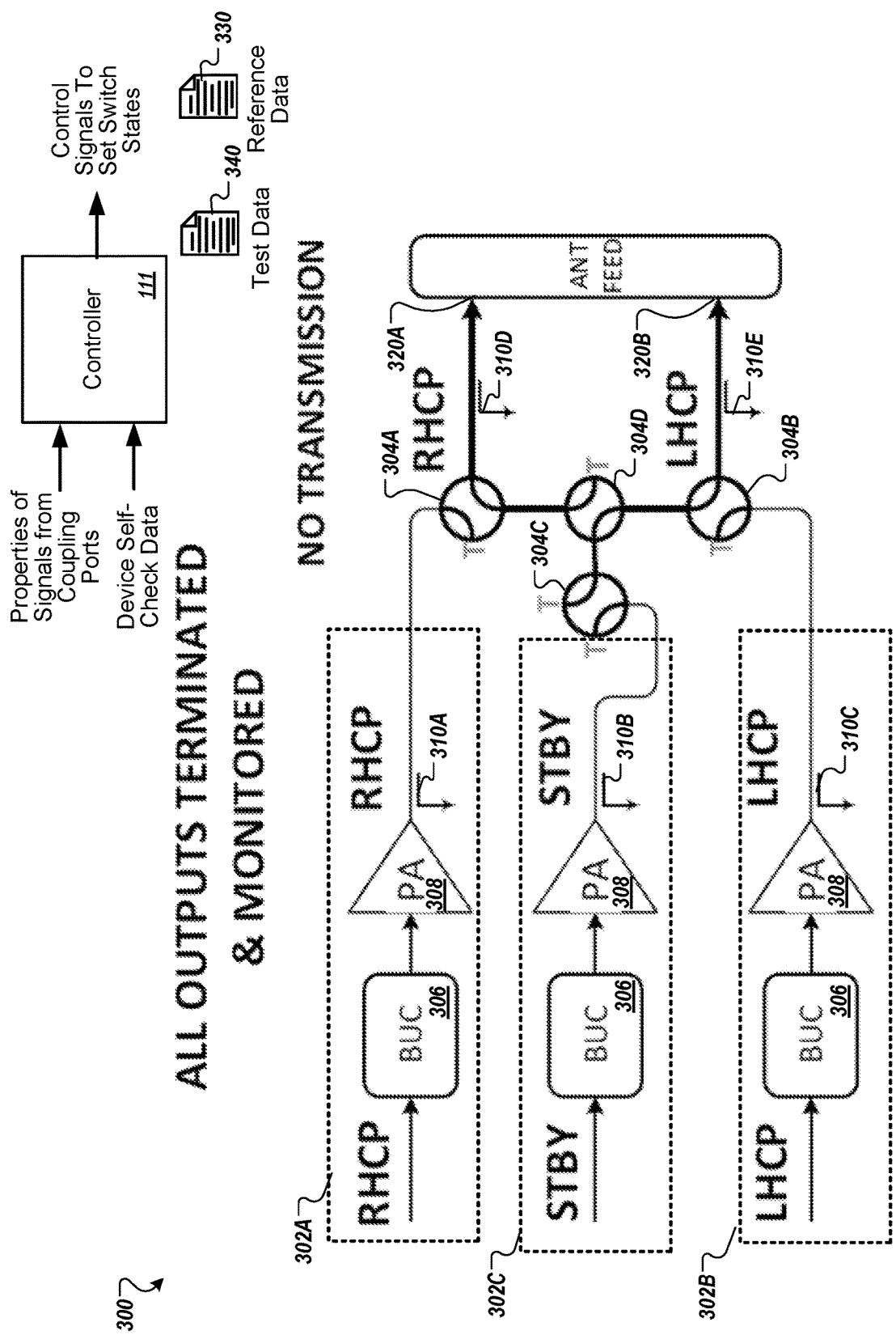
FIG. 6 is a diagram of the gateway of FIG. 3 operating as a standby gateway under monitoring.

FIG. 6 is a diagram that illustrates an example of the gateway 300 with all of the transmit chains 302A-302C operating in a standby mode. In some cases, it is desirable to have a gateway that is not currently in use ready to begin service. For example, if a primary gateway experiences damage or severe interference, a standby gateway at another geographical location (e.g., 100 miles away) can be ready to take over the traffic for the primary gateway to avoid a service outage.

The gateway 300 is shown in standby mode, with the gateway 300 not in active use, but is ready to begin transmissions when another gateway fails, e.g., due to heavy rain, equipment failure, interference, etc. While the gateway 300 is not in active use, there is no output provided to the antenna feed ports 320A-320B. For example, the switches 304A-304D are set to terminate the connections to the antenna feed ports 320A-320B, as indicated by "T" status. The switches 304A-304D also connect each of the transmit chains 302A-302C with a termination load so the transmit chains 302A-302C can be monitored. For example, the equipment of the gateway 300, including the up-converters 306 and power amplifiers 308 on the multiple transmit chains 302A-302C, can remain powered on and ready. The controller 111 can periodically cause test signals to be transmitted as input to each transmit chain 302A-302C, and the controller 111 can monitor the output of each transmit chain 302A-302C that is produced in response, using monitoring signals from the coupling ports 310A-310C. The continual monitoring of the health of the gateway 300 during standby operation can make sure that the gateway 300 is ready to be switched to for active use, when another gateway fails.

In the example of FIGS. 3-6, the gateway 300 can similarly include multiple receive chains, including one or more standby receive chains, as discussed for FIG. 2. The controller 111 can selectively route different antenna inputs to the different receive chains to respond to failures. In addition, the receive chains may be coupled to the antenna feed ports for signal reception through four switches rather than two, to enable switching so that any and all of the receive chains may be simultaneously decoupled from the antenna feed ports. For example, the arrangement of switches 304A-304D can be used, placed between antenna ports and low-noise amplifier inputs. This can enable each of the receive chains, and not only the standby receive chains, to be coupled to a test input for testing, which allows operation and testing of all of the receive chains in a standby mode when the gateway 300 as a whole is operating in standby mode.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be added, or steps can be eliminated, from the described flows, and other components can be added to, or removed from, the described systems. Accordingly, other embodiments are within the scope of the following claims.

What is claimed is:

1. A satellite gateway comprising:
   a first radiofrequency chain configured to transmit or receive information on a first channel;
   a second radiofrequency chain configured to transmit or receive information on a second channel;
   a third radiofrequency chain configured to operate in a standby mode while the first radiofrequency chain and second radiofrequency chain are operational;
   radiofrequency switches configured to (i) switch between coupling the first radiofrequency chain and the third radiofrequency chain to a first antenna feed port for the first channel, and (ii) switch between coupling the second radiofrequency chain and the third radiofrequency chain to a second antenna feed port for the second channel; and a controller configured to monitor a status of the radiofrequency chains, to detect failures of the radiofrequency chains based on the monitoring, and to instruct the radiofrequency switches to (i) couple the third radiofrequency chain to the first antenna feed port when a failure is detected for the first radiofrequency chain, and (ii) couple the third radiofrequency chain to the second antenna feed port when a failure is detected for the second radiofrequency chain.

2. The satellite gateway of claim 1, wherein the first channel is first physical channel in which communication occurs over a particular frequency band with a left-hand circular polarization;
wherein the second channel is second physical channel in which communication occurs over the particular frequency band with a left-hand circular polarization; and
wherein the first antenna feed port is coupled to a right-hand circular polarized antenna and is configured to receive signals for transmission with a right-hand circular polarization, and wherein the second antenna feed port is coupled to a left-hand circular polarized antenna and is configured to receive signals for transmission with a left-hand circular polarization.

3. The satellite gateway of claim 1, wherein the first radiofrequency chain, the second radiofrequency chain, and the third radiofrequency chain are each transmit chains.

4. The satellite gateway of claim 3, wherein the first radiofrequency chain includes a first up-converter and a first power amplifier;
wherein the second radiofrequency chain includes a second up-converter and a second power amplifier; and
wherein the third radiofrequency chain includes a third up-converter and a third power amplifier.

5. The satellite gateway of claim 4, wherein the first radiofrequency chain includes a first modulator;
wherein the second radiofrequency chain includes a second modulator; and
wherein the third radiofrequency chain includes a third modulator.

6. The satellite gateway of claim 4, wherein the radiofrequency switches are placed between the power amplifiers and the antenna feed ports to selectively provide outputs of the power amplifiers to the antenna feed ports.

7. The satellite gateway of claim 1, wherein the first radiofrequency chain, the second radiofrequency chain, and the third radiofrequency chain are each receive chains.

8. The satellite gateway of claim 7, wherein the first radiofrequency chain includes a first amplifier and a first down-converter;
wherein the second radiofrequency chain includes a second amplifier and a second down-converter; and
wherein the third radiofrequency chain includes a third amplifier and a third down-converter.

9. The satellite gateway of claim 8, wherein the first radiofrequency chain includes a first demodulator;
wherein the second radiofrequency chain includes a second demodulator; and
wherein the third radiofrequency chain includes a third demodulator.

10. The satellite gateway of claim 8, wherein the radiofrequency switches are placed between the antenna feed ports and the amplifiers to selectively provide input from the antennas to the amplifiers of the receive chains.

11. The satellite gateway of claim 1, wherein the radiofrequency switches comprise two radiofrequency switches, including (i) a first switch arranged to switch the first radiofrequency chain and the third radiofrequency chain between the first antenna feed port and a termination, and (ii) a second switch arranged to switch the second radiofrequency chain and the third radiofrequency chain between the second antenna feed port and a termination.

12. The satellite gateway of claim 1, wherein the radiofrequency switches comprise four radiofrequency switches arranged to selectively (i) couple one of the antenna feed ports with one of the radiofrequency chains, (ii) couple two of the antenna feed ports to different radiofrequency chains, or (iii) couple none of the antenna feed ports to any of the radiofrequency chains.

13. The satellite gateway of claim 1, wherein each of the first radiofrequency chain, the second radiofrequency chain, and the third radiofrequency chain has a coupling port between the radiofrequency chain and the radiofrequency switches; and
wherein the controller is configured to receive, for each of the radiofrequency chains, data indicating a status of signals on the radiofrequency chain that is based on the signals on the coupling port for the radiofrequency chain.

14. The satellite gateway of claim 1, wherein the first radiofrequency chain, the second radiofrequency chain, and the third radiofrequency chain are transmit chains;
wherein the radiofrequency switches are placed between outputs of the transmit chains and the antenna feeds to (i) switch between coupling the output of the first radiofrequency chain and the output of the third radiofrequency chain to the first antenna feed port for the first channel, and (ii) switch between coupling the output of the second radiofrequency chain and the output of the third radiofrequency chain to the second antenna feed port for the second channel; and
wherein the first channel and the second channel each involve communication over a same particular frequency band using different polarizations, such that the radiofrequency switches are configured to selectively couple the output of the third radiofrequency chain to (i) the first antenna feed port for transmission using a first polarization of the different polarizations and (ii) the second antenna feed port for transmission using a second polarization of the different polarizations.

15. The satellite gateway of claim 14, further comprising:
a first coupling port placed to provide output signals at the output of the first radiofrequency chain;
a second coupling port placed to provide output signals at the output of the second radiofrequency chain;
a third coupling port placed to provide output signals at the output of the third radiofrequency chain; and
a spectrum analyzer configured to determine properties of the output signals;
wherein the controller is configured to monitor the status of the radiofrequency chains based on the properties indicated by the spectrum analyzer.

16. The satellite gateway of claim 1, wherein the controller is configured to monitor the status of the radiofrequency chains by detecting whether output of the radiofrequency chains deviate from a predetermined set of reference properties.

17. A method comprising:
operating, by a controller in a gateway of a satellite communication system, (i) a first radiofrequency chain configured to transmit or receive information on a first channel, (ii) a second radiofrequency chain configured to transmit or receive information on a second channel, and (iii) a third radiofrequency chain in a standby mode in which the third radiofrequency chain does not transmit or receive information in the satellite communication system, wherein the gateway includes radiofrequency switches configured to (i) switch between coupling the first radiofrequency chain and the third radiofrequency chain to a first antenna feed port for the first channel, and (ii) switch between coupling the second radiofrequency chain and the third radiofrequency chain to a second antenna feed port for the second channel;

monitoring, by a controller in a gateway of a satellite communication system, a status of the first radiofrequency chain and the second radiofrequency chain;

based on the monitoring, detecting, by the controller, a failure in the first radiofrequency chain or the second radiofrequency chain; and in response to detecting the failure, causing, by the controller, the radiofrequency switches to couple the third radiofrequency chain to one of the antenna feed ports in place of the radiofrequency chain in which the failure is detected.

18. The method of claim 17, further comprising:
providing a test input to the third radiofrequency chain;
receiving a test output that the third radiofrequency chain produced in response to the test input; and
determining, based on the test output, that the third radiofrequency chain is operating correctly;
wherein causing the radiofrequency switches to couple the third radiofrequency chain to one of the antenna feed ports is based on determining that the third radiofrequency chain is operating correctly.

19. The method of claim 17, wherein the first radiofrequency chain, the second radiofrequency chain, and the third radiofrequency chain are each transmit chains;
wherein the first radiofrequency chain includes a first modulator, a first up-converter, and a first power amplifier;
wherein the second radiofrequency chain includes a second modulator, a second up-converter, and a second power amplifier;
wherein the third radiofrequency chain includes a third modulator, a third up-converter, and a third power amplifier;

wherein causing the radiofrequency switches to couple the third radiofrequency chain to one of the antenna feed ports comprises causing the radiofrequency switches to couple the third radiofrequency chain to the first antenna feed port in place of the first radiofrequency chain; and
wherein the method further comprises routing data to be transmitted on the first channel to the third modulator instead of to the first modulator.

20. One or more non-transitory computer-readable storage media coupled to one or more processors and having instructions stored thereon which, when executed by the one or more processors, cause the one or more processors to perform operations comprising:

operating, by a controller in a gateway of a satellite communication system, (i) a first radiofrequency chain configured to transmit or receive information on a first channel, (ii) a second radiofrequency chain configured to transmit or receive information on a second channel, and (iii) a third radiofrequency chain in a standby mode in which the third radiofrequency chain does not transmit or receive information in the satellite communication system, wherein the gateway includes radiofrequency switches configured to (i) switch between coupling the first radiofrequency chain and the third radiofrequency chain to a first antenna feed port for the first channel, and (ii) switch between coupling the second radiofrequency chain and the third radiofrequency chain to a second antenna feed port for the second channel;

monitoring, by a controller in a gateway of a satellite communication system, a status of the first radiofrequency chain and the second radiofrequency chain;

based on the monitoring, detecting, by the controller, a failure in the first radiofrequency chain or the second radiofrequency chain; and in response to detecting the failure, causing, by the controller, the radiofrequency switches to couple the third radiofrequency chain to one of the antenna feed ports in place of the radiofrequency chain in which the failure is detected.

\* \* \* \* \*